(12) United States Patent
Knapczyk et al.

(10) Patent No.: US 10,752,076 B2
(45) Date of Patent: Aug. 25, 2020

(54) HYDRAULIC DAMPER WITH A COMPRESSION STOP ASSEMBLY

(71) Applicant: BeijingWest Industries Co., Ltd., Beijing (CN)

(72) Inventors: Marcin Knapczyk, Cracow (PL); Pawel Slusarczyk, Cracow (PL)

(73) Assignee: BEIJINGWEST INDUSTRIES CO., LTD., Beijing (CN)

(*) Notice: Subject to any disclaimer, the term of this patent is extended or adjusted under 35 U.S.C. 154(b) by 28 days.

(21) Appl. No.: 16/137,551

(22) Filed: Sep. 21, 2018

(65) Prior Publication Data
US 2019/0375263 A1    Dec. 12, 2019

Related U.S. Application Data

(60) Provisional application No. 62/682,108, filed on Jun. 7, 2018.

(51) Int. Cl.
*F16F 9/58*      (2006.01)
*B60G 17/08*    (2006.01)
(Continued)

(52) U.S. Cl.
CPC ............ *B60G 17/08* (2013.01); *B60G 13/08* (2013.01); *B60G 15/061* (2013.01); *F16F 9/18* (2013.01);
(Continued)

(58) Field of Classification Search
CPC ...... F16F 9/48; F16F 9/486; F16F 9/49; F16F 9/58; F16F 9/585
See application file for complete search history.

(56) References Cited

U.S. PATENT DOCUMENTS

| 3,033,556 A | 5/1962 | Wossner |
| 3,171,643 A * | 3/1965 | Roos .................... F16F 9/0209 267/64.15 |

(Continued)

FOREIGN PATENT DOCUMENTS

| CN | 107542835 A | 1/2018 |
| CN | 108050195 A | 5/2018 |

(Continued)

OTHER PUBLICATIONS

Extended European Search Report dated Oct. 16, 2019 for counterpart European patent application No. EP19173766.7.
(Continued)

*Primary Examiner* — Bradley T King
(74) *Attorney, Agent, or Firm* — William H. Honaker; Dickinson Wright PLLC

(57) ABSTRACT

A damper assembly includes a main tube disposed on a center axis and extending between a first and a second end defining a fluid chamber for containing a working fluid. A main piston is slidably disposed in the fluid chamber dividing the fluid chamber into a rebound chamber and a compression chamber. A piston rod is attached to the main piston for moving the main piston between a compression and a rebound stroke. The piston rod includes a rod extender attached to the main piston defining a compartment. A compression stop including an additional piston is slidably disposed in the compartment and movable between a first position in response to the compression stroke and a second position in response to the rebound stroke. The first position is the additional piston being disposed adjacent the main piston. The second position is the additional piston being axially spaced from the main piston.

19 Claims, 4 Drawing Sheets

(51) Int. Cl.
*B60G 13/08* (2006.01)
*B60G 15/06* (2006.01)
*F16F 9/18* (2006.01)
*F16F 9/32* (2006.01)
*F16F 9/48* (2006.01)
*F16F 13/00* (2006.01)
*F16F 9/348* (2006.01)

(52) U.S. Cl.
CPC ............ *F16F 9/182* (2013.01); *F16F 9/3221* (2013.01); *F16F 9/48* (2013.01); *F16F 9/585* (2013.01); *F16F 13/007* (2013.01); *B60G 2202/30* (2013.01); *B60G 2206/41* (2013.01); *B60G 2500/10* (2013.01); *B60G 2800/162* (2013.01); *F16F 9/185* (2013.01); *F16F 9/348* (2013.01); *F16F 2228/066* (2013.01)

(56) References Cited

U.S. PATENT DOCUMENTS

| | | | |
|---|---|---|---|
| 3,222,048 A | 12/1965 | Wilkins | |
| 3,549,168 A | 12/1970 | Swanson | |
| 3,790,146 A | 2/1974 | Hoffmann et al. | |
| 3,806,105 A * | 4/1974 | Konishi | B60R 19/32 267/116 |
| 3,860,225 A * | 1/1975 | Nakamura | B60R 19/32 267/64.15 |
| 3,998,132 A | 12/1976 | Rasigade | |
| 4,325,567 A | 4/1982 | Hendrickson | |
| 4,915,364 A | 4/1990 | Perlini | |
| 5,219,152 A * | 6/1993 | Derrien | B60G 17/0416 267/118 |
| 5,413,030 A | 5/1995 | Richardson et al. | |
| 5,996,978 A * | 12/1999 | Asanuma | B60G 17/0408 188/315 |
| 9,815,517 B2 * | 11/2017 | Gonzalez | B62K 25/08 |
| 2009/0283373 A1 * | 11/2009 | Satou | F16F 9/20 188/319.1 |
| 2016/0040742 A1 * | 2/2016 | Yamashita | F16F 9/342 188/284 |
| 2017/0328439 A1 * | 11/2017 | Flacht | F16F 9/3214 |
| 2019/0329623 A1 * | 10/2019 | Van De Plas | F16F 9/5126 |

FOREIGN PATENT DOCUMENTS

| | | | |
|---|---|---|---|
| DE | 1530741 | 11/1969 | |
| FR | 2341763 A1 | 9/1977 | |
| FR | 2672356 | 8/1992 | |
| GB | 166098 | 1/1922 | |
| GB | 799760 | 8/1958 | |
| GB | 799760 A * | 8/1958 | ............ F16F 9/486 |
| GB | 1143584 | 2/1969 | |
| GB | 1163920 | 9/1969 | |
| GB | 2060814 A | 5/1981 | |
| JP | 4850174 | 7/1973 | |
| JP | 6267344 | 3/1987 | |

OTHER PUBLICATIONS

First Office Action and search report dated May. 26, 2020 for counterpart Chinese patent application No. 201910451077.3, along with machine EN translation downloaded from EPO.

* cited by examiner

HYDRAULIC DAMPER WITH A COMPRESSION STOP ASSEMBLY

CROSS REFERENCE TO RELATED APPLICATION

This application claims the benefit of U.S. Provisional Patent Application Ser. No. 62/682,108 filed on Jun. 7, 2018, the entire disclosure of which is incorporated herein by reference in its entirety.

BACKGROUND OF THE INVENTION

1. Field of the Invention

The present invention generally relates to a damper assembly for a vehicle.

2. Description of the Prior Art

Damper assemblies are well known in the art for use in a vehicle. One such a damper assembly is disclosed in Patent publications GB1143584 which discloses a damper assembly including a main tube disposed on a center axis and extending between a first end and a second end. The damper defines a fluid chamber between the first end and the second end for containing a working fluid. A main piston is slidably disposed in the fluid chamber dividing the fluid chamber into a rebound chamber and a compression chamber. The compression chamber extends between the first end and the main piston. The rebound chamber extends between the second end and the main piston. A piston rod is disposed on the center axis extending along the center axis to a distal end and attached to the main piston for moving the main piston between a compression stroke and a rebound stroke. The piston rod includes a rod extender extending outwardly from the distal end and attached to the main piston defining a compartment.

Similar assemblies are also disclosed in publications U.S. Pat. No. 3,222,048 and GB1163920.

SUMMARY OF THE INVENTION

The present invention provides a damper assembly having a reduce dead length. The present invention also provides a damper assembly that has an improved performance and an extended applicability. The present invention further provides a compression stop that is cost efficient and simple in manufacture. The present invention provides a damper assembly with a compression stop that would not require substantial modifications of the remaining components of a damper assembly and may be employed as an add-on device in existing damper designs.

The damper assembly includes a main tube disposed on a center axis and extending between a first end and a second end. The damper defines a fluid chamber between the first end and the second end for containing a working fluid. A main piston is slidably disposed in the fluid chamber dividing the fluid chamber into a rebound chamber and a compression chamber. The compression chamber extends between the first end and the main piston. The rebound chamber extends between the second end and the main piston. A piston rod is disposed on the center axis extending along the center axis to a distal end and attached to the main piston for moving the main piston between a compression stroke and a rebound stroke. The piston rod includes a rod extender extending outwardly from the distal end and attached to the main piston defining a compartment. The compartment extends between the distal end and the main piston along the center axis and in fluid communication with the fluid chamber. A compression stop including an additional piston is disposed in the compartment for generating an additional damping force. The additional piston is slidably disposed in the compartment and movable between a first position in response to the compression stroke and a second position in response to the rebound stroke to increase stroke length of the compression stroke and the rebound stroke. The first position is the additional piston being disposed adjacent the main piston. The second position is the additional piston being adjacent to the distal end of the piston rod and axially spaced from the main piston.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
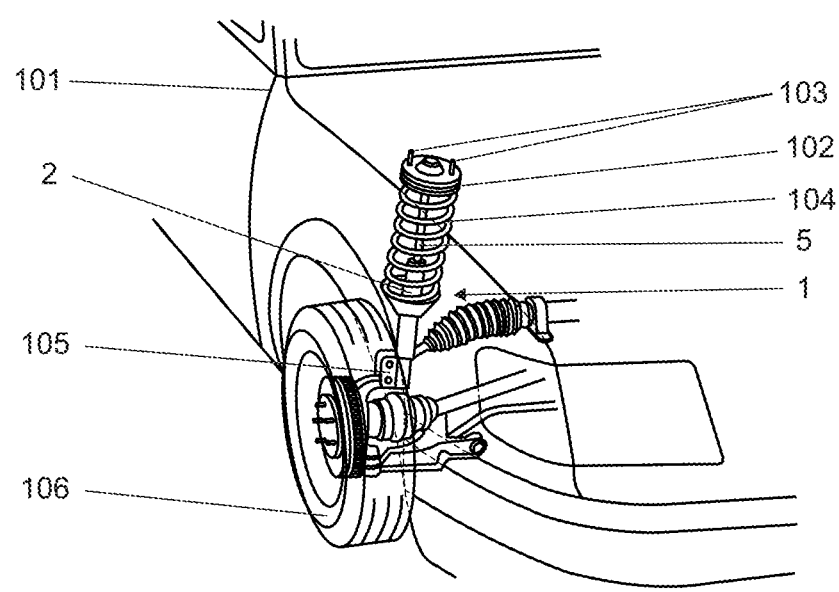
FIG. 1 is fragmentary view of a vehicle suspension including the damper assembly in accordance with the present invention.

Referring to the Figures, wherein like numerals indicate corresponding parts throughout the several views, it is one aspect of the present invention to provide a damper assembly 1 for a vehicle. A generally illustrated in FIG. 1, the damper assembly 1 is attached to a vehicle chassis 101 by a top mount 102. A number of screws 103 is disposed on the periphery of the upper surface of the top mount 102 to fasten the top mount 102 to the vehicle chasis 101. The top mount 102 is connected to a coil spring 104 and a piston rod 5 of the damper assembly 1. The damper assembly 1 is also connected to the knuckle 105 supporting the vehicle wheel 106.

Figure 2:
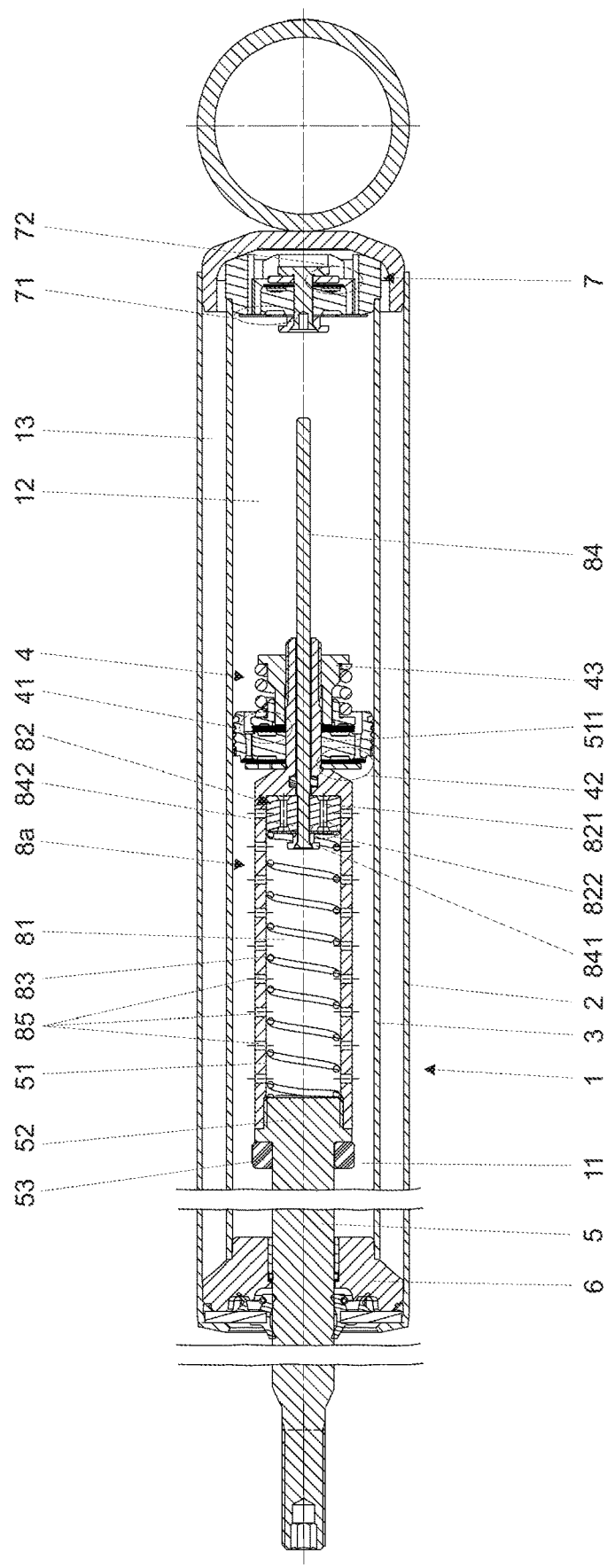
FIG. 2 is a cross-sectional perspective view of the damper assembly.

As generally shown in FIG. 2, the damper assembly 1 includes a main tube 3, having a generally cylindrical shape, disposed on a center axis A between a first end and second end. The main tube 3 defines a fluid chamber 11, 12 along the center axis A between the first end and the second end for containing a working fluid. An external tube 2, having a generally cylindrical shape, is disposed on the center axis A spaced from the main tube 3 and extending about the main tube 3 between a closed end and an opened end. The closed end is disposed adjacent to the first end. The opened end is disposed adjacent to the second end. The external tube 2 and the main tube 3 defines a compensation chamber 13 extending between the main tube 3 and the external tube 2 about the center axis A and in fluid communication with the fluid chamber 11, 12. It should be appreciated that the external tube 2 can include a bushing having a sleeve disposed at the closed end of the external tube and attached to the closed end of the external tube for connecting the damper assembly 1 to the knuckle 105 supporting the wheel 106 of the vehicle. A piston rod guide 6 is disposed at the second end of the main tube 3 and the opened end of the external tube 2 and in sealing engagement with the main tube 3 and the external tube 2 to close the fluid chamber 11, 12 and the compensation chamber 13.

A main piston 4, having a generally cylindrical shape, is slidably disposed in the fluid chamber 11, 12 and movable along the center axis A dividing the fluid chamber 11, 12 into a rebound chamber 11 and a compression chamber 12. The compression chamber 12 is between the first end and the main piston 4 and in fluid communication with the compensation chamber 13. The rebound chamber 11 is between the second end and the main piston 4. A piston rod 11, having a generally cylindrical shape, is disposed on the center axis A extending along the center axis A through the piston rod guide 6 to a distal end and attached to the main piston 4 for moving the main piston 4 between a compression stroke and a rebound stroke. During the compression stroke, the main piston 4 and the piston rod 5 move toward the first end of the main tube 3 and the closed end of the external tube 2. During the rebound stroke, the piston rod 5 and the main piston 4 move toward the second end of the main tube 3 and the opened end of the external tube 2. A bumper 53, having a generally circular shape, is disposed in the rebound chamber 11 and axially spaced from the distal end of the piston rod 5 for engaging the piston rod guide 6 during the rebound stroke to reduce the force of the piston rod 5 during the rebound stroke.

It should be appreciated that the term "compression" as used herein with reference to particular elements of the damper assembly 1 refers to these elements or parts of elements which are adjacent to (or facing) the compression chamber 12 or, in a case of working liquid flow direction, it refers to this flow direction that takes place during the compression stroke of the damper assembly 1. Similarly the term "rebound" as used in this specification with reference to particular elements of the damper assembly 1 refers to these elements or these parts of particular elements which are adjacent to (or facing) the rebound chamber 11 or, in a case of working liquid flow direction, it refers to this flow direction that takes place during the rebound stroke of the damper assembly 1.

The main piston 4 has a compression surface and a rebound surface. The compression surface is disposed in the compression chamber 12 facing the closed end. The rebound surface is disposed in the rebound chamber 11 facing the opened end. The main piston 4 defines a plurality of passages including a set of inner passages and a set of outer passage. The inner passages are disposed adjacent to the center axis A and extend between the rebound surface and the compression surface. The outer passages are radially spaced from the inner passages and extend between the rebound surface and said compression surface for allowing the working fluid to flow through the passages. The main piston 4 includes a first compression valve 42 and a first rebound valve 41. The first compression valve 42 includes a plurality of discs, each having a generally circular shape, disposed on the rebound surface of the main piston 4 covering the outer passages for limiting the flow of the working fluid through the main piston 4 to provide a damping force during the compression stroke. The first rebound valve 41 includes a plurality of discs, each having a generally circular shape, disposed on the compression surface of the main piston 4 covering the inner passages for limiting the flow of the working fluid through the main piston 4 to provide a damping force during the rebound stroke.

A base valve 7 is disposed at the first end of the main tube 3 and attached to the first end of the main tube 3 for restricting fluid flow between the fluid chamber 11, 12 and the compensation chamber 13. The base valve 7 defines a plurality of conduits including a set of inner conduits and a set of outer conduits for allowing the working fluid to flow through the base valve 7 during the rebound stroke and the compression stroke. The inner conduits is disposed adjacent to the center axis A and extends through the base valve 7. The outer conduits is radially spaced from the inner conduits and extending through the base valve 7. The base valve 7 includes a second rebound valve 71 and a second compression valve 72 for restricting working fluid flow through the base valve 7 during the compression stroke and the rebound stroke. The second rebound valve 71 is disposed in the compression chamber 12 attached to the base valve 7 and covering the outer conduits to restrict the working fluid flow from the fluid chamber 11, 12 through the base valve 7 to the compensation chamber 13 during the rebound stroke. The second rebound valve 71 is disposed in the compensation chamber 13 attached to the base valve 7 covering the inner conduits to restrict the working fluid flow from the fluid chamber 11, 12 through the base valve 7 to the compensation chamber 13 during the compression stroke.

The piston rod 5 includes a rod extender 51 extending outwardly from the distal end of the piston rod 5 and attached to the main piston 4 defining a compartment 81. The compartment 81, having a generally cylindrical shape, extends along the center axis A between the distal end and the main piston 4 and in fluid communication with the fluid chamber 11, 12. The rod extender 51 defines at least one orifice 85, having a generally circular shape, for allowing the working fluid to flow into the compartment 81. The at least one orifice 85 includes a plurality of orifices 85 disposed along the rod extender 51 radially and axially spaced from one another to allow the working fluid to flow into the compartment 81. It should be appreciated that the plurality of orifices 85 can be disposed on the rod extender 51, along the center axis A, and equidistantly from one another. The number, shape, size and distribution of the orifices 85 on the wall of the compartment 81 provide design parameters that may be used to achieve desired characteristic of the compression stop 8a.

Figure 4:
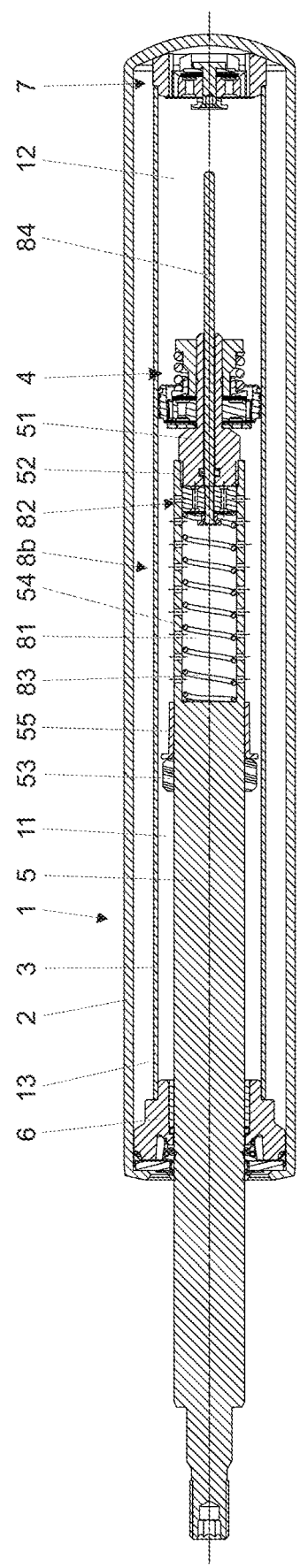
FIG. 4 is a cross-sectional perspective view of an alternative embodiment of the damper assembly.

In one embodiment, the distal end of the piston rod 5 can include an external thread 52 disposed at the distal end of the piston rod 5 and extending helically about the distal end of the piston rod 5. The rod extender 51, having a generally tubular shape, is disposed in threaded engagement with the distal end of the piston rod 5 and extending outwardly from the piston rod 5 and annularly about the center axis A toward said first end of the main tube 3 to a terminal end spaced from the first end and defining the compartment 81. A threaded projection 511, having a generally tubular shape, extends outwardly from the terminal end and annularly about the center axis A toward the first end of the main tube 3 to a projection end spaced from the first end. The main piston 4 is disposed about the threaded projection 511 between the terminal end of the rod extender 51 and the projection end. A nut 43 is disposed at the projection end and in threaded engagement with the projection end to secure the main piston 4 and the first compression valve 42 and the first rebound valve 41 to the threaded projection 511. In an alternative embodiment, as shown in FIG. 4, the compression stop is generally indicated as 8b. The rod extender 51 is a hollow section 54 integral with the distal end of the piston rod 5 and extends along the center axis A from the distal end to the main piston 4 to define the compartment 81. The hollow section 54 can include an internal thread 52 to receive the threaded projection 511 along the center axis A. In another embodiment of the present invention, as best shown in FIG. 4, a rebound stop 55 is disposed in the rebound chamber 11 extending annularly about the center axis A and in abutment relationship with the piston rod 5 and the bumper 53 to provide support to the bumper 53.

Figure 3B:
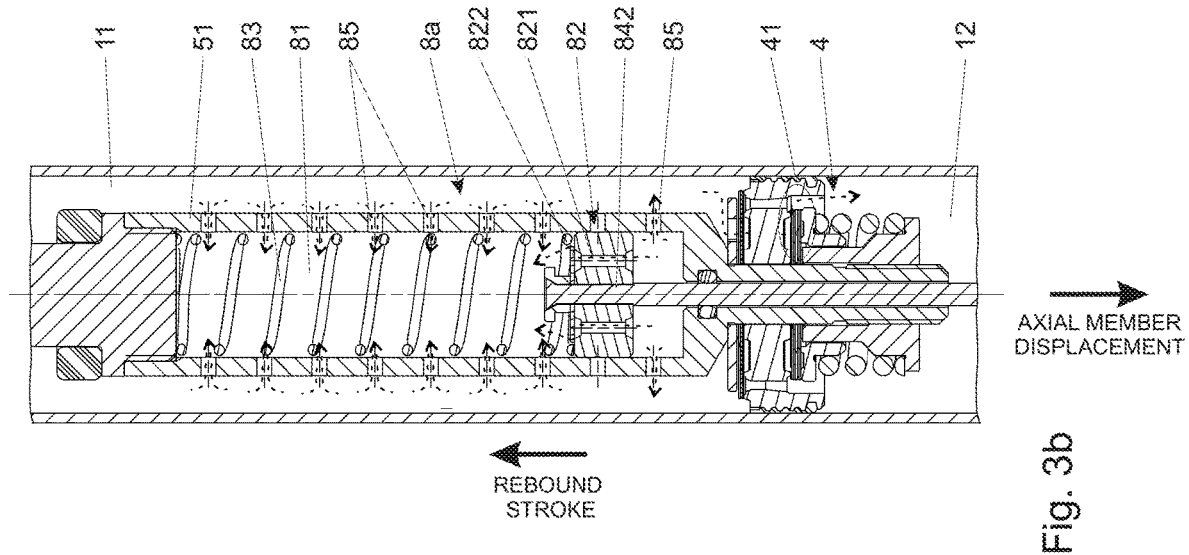
FIG. 3b is an enlarged cross-sectional fragmentary view of the additional piston of the damper during a rebound stroke.
Figure 3A:
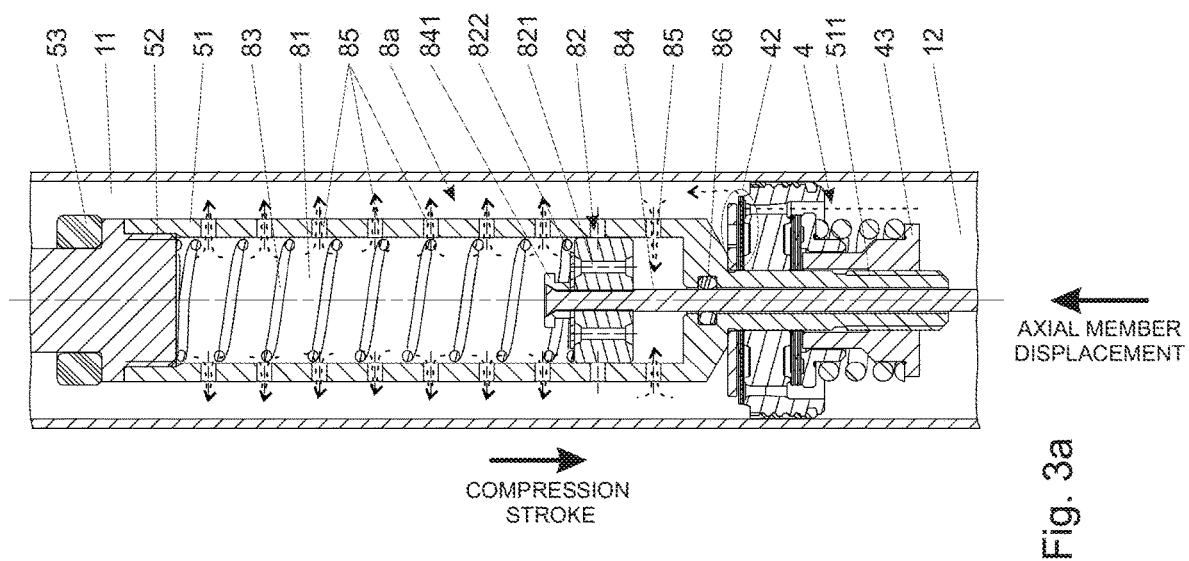
FIG. 3a is an enlarged cross-sectional fragmentary view of the additional piston of the damper during a compression stroke.

Referring to FIGS. 3-4, a compression stop 8a, 8b is disposed in the compartment 81 of the rod extender 51 for generating an additional damping force during the compression stroke to avoid abrupt stop of the piston rod 5 and the main piston 4 during the compression stroke. As best shown in FIGS. 3a and 3b, the compression stop 8a includes an additional piston 82, having a generally cylindrical shape, slidably disposed in the compartment 81 of the rod extender 51 and movable between a first position in response to the compression stroke and a second position in response to the rebound stroke. In the first position, the additional piston 82 is disposed adjacent the terminal end of the rod extender 51. In the second position, the additional piston 82 is disposed adjacent the distal end of the piston rod 5. In other words, the additional piston 82 is axially displaceable in the compartment 81 along the center axis A between the first position and the second position. The additional piston 82 defines at least one channel 821 extending through the additional piston 82 radially spaced from the center axis A for allowing the working fluid to flow through the additional piston 82. The at least one channel 821 includes a plurality of channels 821 radially spaced from the center axis A and circumferentially spaced from one another. The additional piston 82 further includes a flexible disc 822 disposed the compartment 81 between the additional piston 82 and the elastic member 83 covering the at least one channel 821 to restrict working fluid flow through the at least one channel 821 during the rebound stroke.

An axial member 84, having a generally cylindrical shape, disposed on the center axis A in the compartment 81 and attached to the additional piston 82. The axial member 84 extends outwardly from the additional piston 82, along the center axis A, through the threaded projection 511 to a primary end spaced from the base valve 7 for engaging the base valve 7 during the compression stroke. The axial member 84 includes a narrowed section 842 disposed in the compartment 81 and extends through the additional piston 82 to receive the additional piston 82. A rivet 841 is disposed in the compartment 81 and adjacent to the flexible disc 822, attached to the narrowed section 842 of the axial member 84 to secure the flexible disc 822 to the additional piston 82 and attach the additional piston 82 to the axial member 84 for movement with the axial member 84. The rod extender 51 includes a flange extending radially inwardly from the terminal end toward said center axis to engage the axial member 84. The flange of the rod extender 51 defines a groove extending annularly about the center axis A. A seal 86, made from an elastomeric material, is disposed in the groove and extending annularly about the center axis A and in sealing engagement with the axial member 84. An elastic member 83 of a spring disposed in the compartment 81 extending helically about the center axis A between the distal end of the piston rod 5 and the additional piston 82 to bias the additional piston 82 in the first position and return the additional piston 82 from the second position to the first position. It should be appreciated that the elastic member 83 is preloaded in the compartment 81 between the additional piston 82 and the distal end of the piston rod 5 to bias the additional piston 82 in the first position.

Figure 5:
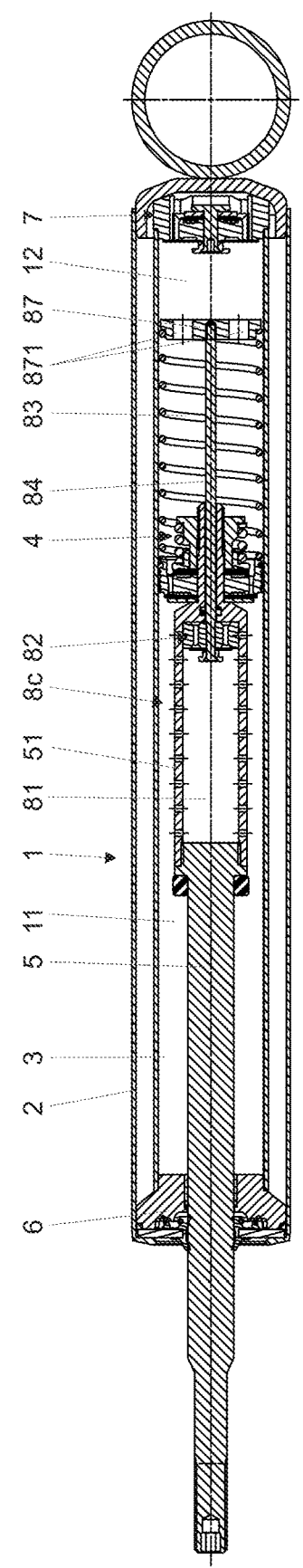
FIG. 5 is a cross-sectional perspective view of an alternative embodiment of the damper assembly.

In an alternative embodiment, as illustrated in FIG. 5, the damper assembly 1 includes a partition member 87, having a generally cylindrical shape, and attached to the primary end of the axial member 84 for movement with the axial member 84. The partition member 87 has at least one opening 871, radially spaced from the center axis A, extending through the partition member 87 for allowing the working fluid to flow through the partition member 87. Instead of being disposed in the compartment 81, the elastic member 83 of a spring is disposed in the compression chamber 12 extending helically about the center axis A between the main piston 4 and the partition member 87 to bias the additional piston 82 in the first position and return the additional piston 82 from the second position to the first position.

The operation of the damper assembly 1 is illustrated in FIGS. 3a and 3b. During the compression stroke, as shown in FIG. 3a, the piston rod 5 and the main piston 4 moves axially along the center axis A toward the base valve 7 and the first end of the main tube 3. As the piston rod 5 and the main piston 4 moves toward the base valve 7, the working liquid flows from the compression chamber 12 to the rebound chamber 11 through the first compression valve 42 of the main piston 4. During the compression stroke, the axial member 84 also moves along with the piston rod 5 and the main piston 4. As soon as the axial member 84 engages the base valve 7, the axial member 84 pushes the additional piston 82 from the first position to the second position, i.e. towards the distal end of the piston rod 5, thereby compressing the elastic member 83 in the compartment 81. As indicated by the dash arrows in FIG. 3a, when the additional piston 82 moves from the first position to the second position, the additional piston 82 pushes the working liquid out of the compartment 81 through the orifice between the additional piston 82 and the distal end of the piston rod 5. At the same time, the additional piston 82 also draws in working fluid through the orifice 85 between the additional piston 82 and the main piston 4.

During the rebound stroke, as illustrated in FIG. 3b, the main piston 4 and the piston rod 5 move axially toward the piston rod guide 6, e.g. axially away from the base valve 7. As the main piston 4 and the piston rod 5 move away from the base valve 7, the additional piston 82 axially returns to the first position under the pressure of the elastic member 83. As the elastic member 83 un-compresses in the compartment 81, the axial member 84 provides an additional force pushing the piston rod 5 and the main piston 4 toward the piston rod guide 6 to increase the stroke length of the rebound stroke and minimizes the dead length of the damper assembly 1. As indicated by the dash arrows in FIG. 3b, during the movement of the additional piston 82, the additional piston 82 pushes the working liquid out of the compartment 81 between the additional piston 82 and the main piston 4. At the same time, the additional piston 82 also draws in working fluid through the orifice 85 between the distal end of the piston rod 5 and the main piston 4. To facilitate with the return movement of the additional piston 82, the flexible disc 822 is disposed on the additional piston 82 between the elastic member 83 and the additional piston 82 covering the channels 821. The flexible disc 822 also deflects under the pressure of the working liquid caused by the pressure of the elastic member 83 and enables the liquid to flow through the additional piston 82 to provide an additional damping force.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A damper assembly comprising:
   a main tube disposed on a center axis and extending between a first end and a second end defining a fluid chamber for containing a working fluid;
   a main piston slidably disposed in said fluid chamber dividing said fluid chamber into a rebound chamber and a compression chamber with said compression chamber being between said first end and said main piston and said rebound chamber being between said second end and said main piston;
   a piston rod disposed on said center axis and extending along said center axis to a distal end and attached to said main piston for moving said main piston between a compression stroke and a rebound stroke;
   said piston rod including a rod extender extending outwardly from said distal end and attached to said main piston defining a compartment extending between said distal end and said main piston along said center axis, said compartment being in fluid communication with said fluid chamber; and
   a compression stop including an additional piston is disposed in said compartment for generating an additional damping force with said additional piston being slidably disposed in said compartment and movable between a first position in response to said compression stroke and a second position in response to said rebound stroke with said first position being defined as said additional piston being disposed adjacent said main piston and said second position being defined as said additional piston being adjacent to said distal end of said piston rod and axially spaced from said main piston;
   wherein said rod extender defines at least one orifice for allowing the working fluid to flow into said compartment;
   wherein said at least one orifice includes a plurality of orifices disposed along said rod extender radially and axially spaced from one another to allow the working fluid to flow into said compartment.

2. The damper assembly as set forth in claim 1 wherein said rod extender is attached to said distal end of said piston rod and extends outwardly from said piston rod and annularly about said center axis toward said first end of said main tube to a terminal end spaced from said first end and defines said compartment extending between said distal end of said piston rod and said terminal end of said rod extender.

3. The damper assembly as set forth in claim 1 wherein said rod extender is a hollow section integral with said distal end of said piston rod and extending along said center axis from said distal end to said main piston to define said compartment.

4. The damper assembly as set forth in claim 2 further including an axial member disposed on said center axis in said compartment attached to said additional piston and extending outwardly from said additional piston along said center axis through said main piston to a primary end spaced from said main piston and said first end.

5. The damper assembly as set forth in claim 4 wherein said axial member includes a narrowed section disposed in said compartment and extending through said additional piston.

6. The damper assembly as set forth in claim 5 further including a rivet disposed in said compartment and adjacent to said additional piston and attached to said narrowed section of said axial member to attach said additional piston to said axial member for movement with said axial member between said first position and said second position.

7. The damper assembly as set forth in claim 4 wherein said rod extender includes a flange disposed adjacent to said main piston and extending radially inwardly toward said center axis to engage said axial member.

8. The damper assembly as set forth in claim 7 wherein said flange of said rod extender defines a groove extending annularly about said center axis.

9. The damper assembly as set forth in claim 8 further including a seal of elastomeric material disposed in said groove and extending annularly about said center axis and in sealing engagement with said axial member.

10. The damper assembly as set forth in claim 4 further including a partition member attached to said primary end of said axial member for movement with said axial member.

11. The damper assembly a set forth in claim 4 further including a spring disposed in said compartment extending helically about said center axis between said distal end of said piston rod and said additional piston to bias said additional piston in said first position and return said additional piston from said second position to said first position to extend said stroke length during said compression stroke and said rebound stroke.

12. The damper assembly as set forth in claim 10 wherein said partition member defining at least one opening radially spaced from said center axis and extending through said partition member for allowing the working fluid to flow through said partition member.

13. The damper assembly a set forth in claim 10 further including a spring disposed in said compression chamber extending helically about said center axis between said main piston and said partition member to bias said additional piston in said first position and return said additional piston from said second position to said first position.

14. The damper assembly as set forth in claim 11 wherein said additional piston defines at least one channel extending through said additional piston radially spaced from said center axis for allowing the working fluid to flow through said additional piston.

15. The damper assembly as set forth in claim 14 wherein said at least one channel includes a plurality of channels radially spaced from said center axis and circumferentially spaced from one another.

16. The damper assembly as set forth in claim 15 further including a flexible disc disposed in said compartment between said additional piston and said elastic member covering said at least one channel to restrict working fluid flow through said at least one channel during said rebound stroke.

17. A damper assembly comprising:
   a main tube disposed on a center axis and extending between a first end and a second end defining a fluid chamber for containing a working fluid;
   a main piston slidably disposed in said fluid chamber dividing said fluid chamber into a rebound chamber and a compression chamber with said compression chamber being between said first end and said main piston and said rebound chamber being between said second end and said main piston;

a piston rod disposed on said center axis and extending along said center axis to a distal end and attached to said main piston for moving said main piston between a compression stroke and a rebound stroke;

said piston rod including a rod extender extending outwardly from said distal end and attached to said main piston defining a compartment extending between said distal end and said main piston along said center axis, said compartment being in fluid communication with said fluid chamber;

a compression stop including an additional piston is disposed in said compartment for generating an additional damping force with said additional piston being slidably disposed in said compartment and movable between a first position in response to said compression stroke and a second position in response to said rebound stroke with said first position being defined as said additional piston being disposed adjacent said main piston and said second position being defined as said additional piston being adjacent to said distal end of said piston rod and axially spaced from said main piston; and an axial member disposed on said center axis in said compartment attached to said additional piston and extending outwardly from said additional piston along said center axis through said main piston to a primary end spaced from said main piston and said first end;

wherein said rod extender is attached to said distal end of said piston rod and extends outwardly from said piston rod and annularly about said center axis toward said first end of said main tube to a terminal end spaced from said first end and defines said compartment extending between said distal end of said piston rod and said terminal end of said rod extender;

wherein said axial member includes a narrowed section disposed in said compartment and extending through said additional piston.

18. A damper assembly comprising:

a main tube disposed on a center axis and extending between a first end and a second end defining a fluid chamber for containing a working fluid;

a main piston slidably disposed in said fluid chamber dividing said fluid chamber into a rebound chamber and a compression chamber with said compression chamber being between said first end and said main piston and said rebound chamber being between said second end and said main piston;

a piston rod disposed on said center axis and extending along said center axis to a distal end and attached to said main piston for moving said main piston between a compression stroke and a rebound stroke;

said piston rod including a rod extender extending outwardly from said distal end and attached to said main piston defining a compartment extending between said distal end and said main piston along said center axis, said compartment being in fluid communication with said fluid chamber; and a compression stop including an additional piston is disposed in said compartment for generating an additional damping force with said additional piston being slidably disposed in said compartment and movable between a first position in response to said compression stroke and a second position in response to said rebound stroke with said first position being defined as said additional piston being disposed adjacent said main piston and said second position being defined as said additional piston being adjacent to said distal end of said piston rod and axially spaced from said main piston; and an axial member disposed on said center axis in said compartment attached to said additional piston and extending outwardly from said additional piston along said center axis through said main piston to a primary end spaced from said main piston and said first end;

wherein said rod extender is attached to said distal end of said piston rod and extends outwardly from said piston rod and annularly about said center axis toward said first end of said main tube to a terminal end spaced from said first end and defines said compartment extending between said distal end of said piston rod and said terminal end of said rod extender;

wherein said rod extender includes a flange disposed adjacent to said main piston and extending radially inwardly toward said center axis to engage said axial member;

wherein said flange of said rod extender defines a groove extending annularly about said center axis.

19. A damper assembly comprising:

a main tube disposed on a center axis and extending between a first end and a second end defining a fluid chamber for containing a working fluid;

a main piston slidably disposed in said fluid chamber dividing said fluid chamber into a rebound chamber and a compression chamber with said compression chamber being between said first end and said main piston and said rebound chamber being between said second end and said main piston;

a piston rod disposed on said center axis and extending along said center axis to a distal end and attached to said main piston for moving said main piston between a compression stroke and a rebound stroke;

said piston rod including a rod extender extending outwardly from said distal end and attached to said main piston defining a compartment extending between said distal end and said main piston along said center axis, said compartment being in fluid communication with said fluid chamber;

a compression stop including an additional piston is disposed in said compartment for generating an additional damping force with said additional piston being slidably disposed in said compartment and movable between a first position in response to said compression stroke and a second position in response to said rebound stroke with said first position being defined as said additional piston being disposed adjacent said main piston and said second position being defined as said additional piston being adjacent to said distal end of said piston rod and axially spaced from said main piston;

an axial member disposed on said center axis in said compartment attached to said additional piston and extending outwardly from said additional piston along said center axis through said main piston to a primary end spaced from said main piston and said first end; and a spring disposed in said compartment extending helically about said center axis between said distal end of said piston rod and said additional piston to bias said additional piston in said first position and return said additional piston from said second position to said first position to extend said stroke length during said compression stroke and said rebound stroke;

wherein said rod extender is attached to said distal end of said piston rod and extends outwardly from said piston rod and annularly about said center axis toward said first end of said main tube to a terminal end spaced from said first end and defines said compartment extending between said distal end of said piston rod and said terminal end of said rod extender.

\* \* \* \* \*